Nov. 1, 1966 G. H. GUTTROFF 3,283,311

MAGNETIC ELEMENT READ-OUT UTILIZING TRANSMISSION LINE SENSING CIRCUIT

Filed Nov. 1, 1961

INVENTOR
GEORGE H. GUTTROFF

BY William E. Glaser

ATTORNEY

United States Patent Office 3,283,311

Patented Nov. 1, 1966

3,283,311

MAGNETIC ELEMENT READ-OUT UTILIZING TRANSMISSION LINE SENSING CIRCUIT

George H. Guttroff, Norristown, Pa., assignor to Sperry Rand Corporation, New York, N.Y., a corporation of Delaware Filed Nov. 1, 1961, Ser. No. 149,275
6 Claims. (Cl. 340—174)

This invention relates to memory read-out arrangements and more particularly to a read-out system for a magnetic memory element wherein relatively low level signals are generated.

When information is read out from a magnetic memory element such as a magnetizable core or magnetic thin film, etc., the magnetic element is switched from one state of remanence to the other state of remanence by a drive signal. The change in flux which occurs when the magnetic element switches from one state of remanence to the other state of remanence generates information signals on a sense line which is located in close proximity to the magnetic element. However, in addition to information signals being generated there are spurious signals generated by virtue of the inductance and capacitance coupling between the drive signal means and the sense line. These spurious signals are superimposed on the information signals. Since the information signals are low level signals, it is imperative that the spurious signals be either prevented, removed, or attenuated in order to improve the readability of the information signals for further use.

Accordingly, it is an object of the present invention to provide a magnetic memory element read-out system which attenuates spurious signals and passes information signals.

It is a further object of the present invention to provide a magnetic memory element read-out system which includes a means for converting a balanced line into an unbalanced line.

In accordance with a feature of the present invention there is connected to the magnetic memory element a transmission line having a portion thereof wound as a coil around a magnetizable element in order that the spurious signals see the coil as a high impedance and become substantially attenuated, while the information signals are transmitted down the transmission line without seeing said coil as an additional impedance.

In accordance with another feature of the present invention there is provided a second portion of said transmission line also formed as a coil and wound around a magnetizable core which provides a second step of attenuation and enables the balanced line to be transformed into an unbalanced line without signal loss.

The above mentioned and other features and objects of this present invention will become more apparent by reference to the following description taken in conjunction with the accompanying drawings in which.

In general the present system operates to provide a high impedance to spurious signals and a low impedance to the information signals. When a transmission line is employed to carry a signal which appears as two signals with one on each line and 180° out of phase (hereinafter referred to as being the preferred signal), the energy waves traveling down the transmission line provide total zero current flow at any infinitesimal section in the line. That is to say for any such section in the line, the current flowing in one direction in one wire is equal to the current flowing in the other direction in the other wire. Such an arrangement provides that the flux provided by the current flowing in one wire of the transmission line is equal and opposite to the flux provided by the current flowing in the other wire of the transmission line at all sections. Hence, everywhere along the non-contiguous surfaces of the paired wires of the transmission line the flux is cancelled. As a result if such a transmission line is wound into a coil configuration, the preferred signals traveling thereon see no coil inductance, that is no cumulative inductance resulting from a coil configuration even at the frequencies where the length of the line is longer than a fraction of a wave length. On the other hand if signals which are in phase (referred to hereinafter as common-mode signals or spurious signals), that is signals having the same polarity, are transmitted along the transmission line, these signals will provide a cumulative flux in the coil and as a result will provide a high impedance to such common mode signals. Bearing these two principles in mind and looking at FIGURE 1, it becomes apparent that the information signals (preferred signals) will be transmitted along the transmission line to the load while experiencing a minimum of impedance or at least no more impedance than would have been present had there been no coil configuration of the transmission line. On the other hand, the spurious signals generated between the drive signal line and the sensing line are common mode signals and therefore will see a high impedance of the coil and will be substantially attenuated before they reach the load. In accordance with this arrangement the spurious signals are attenuated, the information signals are transmitted with little or no distortion and the readability of the information signals is greatly improved.

Figure 1:
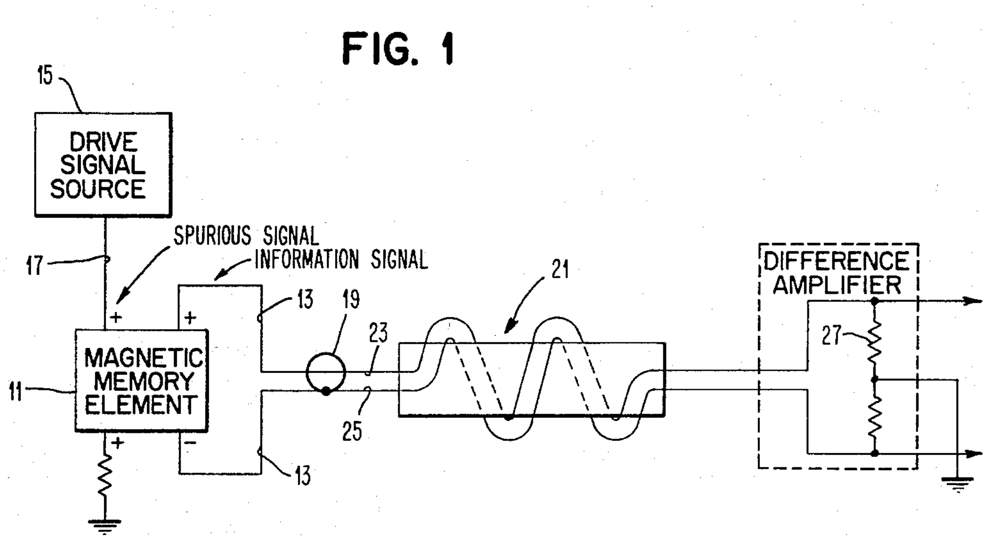
FIGURE 1 is a block schematic of the read-out system.

Examine now FIGURE 1 in detail, in which there is a magnetic memory element 11 which may well represent a magnetizable core, a storage element, a thin film element, a magnetic rod, or some magnetic means which stores information by virtue of its state of magnetic remanence. Such a magnetic memory element provides a signal on a sense line, such as line 13, when the element is switched from one state of remanence to the other. The magnetic memory element 11 is switched from one state of remanence to the other in response to a drive signal being transmitted from the drive signal source 15 along the drive signal wire 17. In response to the changing flux which accompanies the switching of the magnetic element an information signal is generated on the sense line 13. In addition, when the drive signal is applied to drive signal wire 17 there are spurious signals generated on the sense wire 13 by virtue of the inductance and capacitance coupling between the drive signal wire 17 and the sense wire 13. The information signal or preferred signal is depicted as a plus sign and a minus sign in the same vertical position on either side of the magnetic element 11, while the spurious signals or common mode signals are depicted as having the same polarity (plus) in the same vertical line on either side of the magnetic element. It is to be understood that the polarities might be changed, for instance, the spurious signals might both be minus and the polarity of information signals might be interchanged.

The information signal will be considered as two signals which are out of phase by 180° or counterphase. Being in counter-phase the information signals are transmitted down the transmission line 19 in the normal fashion, i.e. since the line 19 is a transmission line the signals will reach the load at the same time and will be equal and opposite in amplitude and phase. The transmission line 19 might be a tightly coupled pair of wires, or a coaxial cable, or a bifilar wire. In the preferred embodiment the bifilar wire is used.

As described above, since the flux generated by the current in the top wire 23 substantially cancels the flux generated in the bottom wire 25 on the non-contiguous surfaces there is no cumulative flux generated in the coil and hence the coil, per se, can be said to have no inductance effect with respect to preferred signals on the transmission line. Hence the information signals are transmitted from the magnetic memory element 11 to the load 27 (which may be a difference amplifier) through the coil configuration 21 without any additional attenuation at low or high frequencies because of the transmission line type of coil configuration.

On the other hand when the spurious signals, which are in phase, are transmitted along the transmission line 19, the flux generated by the currents in the lines 23 and 25 is not cancelling, but instead adding. Therefore, the coil 21 provides cumulative inductance and thus, a high impedance to these spurious signals. As a result of the high impedance the spurious signals are substantially attenuated and their effect at the load 27 is greatly reduced. The employment of the transmission line 19, in addition to providing a high impedance to spurious signals in the coil portion 21 thereof, provides a balanced line at all sections for the common mode signal, an advantage related to cancelling the spurious signals. Because the physical arrangement of the transmission line dictates that the spurious signals are subjected to an equal impedance as they are transmitted thereon, the spurious signals will arrive at the load 27 at the same time and each will have been attenuated the same amount. If two individual wires, in contrast to a transmission line, are wound in a coil configuration, the rejection of the common mode signal and the passing of the preferred signal is dependent on the cumulative flux in the coil. Empirically the two wires have been found to be inferior to the transmission line and it is believed that this is true because of the irregular spacing which occurs when two individual wires are wound in the coil configuration. It becomes clear then that the system shown in FIGURE 1 provides means for readily transmitting information signals from the magnetic memory element 11 to the load 27 along a transmission line while attenuating or blocking the spurious signals which are generated between the drive signal line 17 and the sensing line 13.

Figure 2:
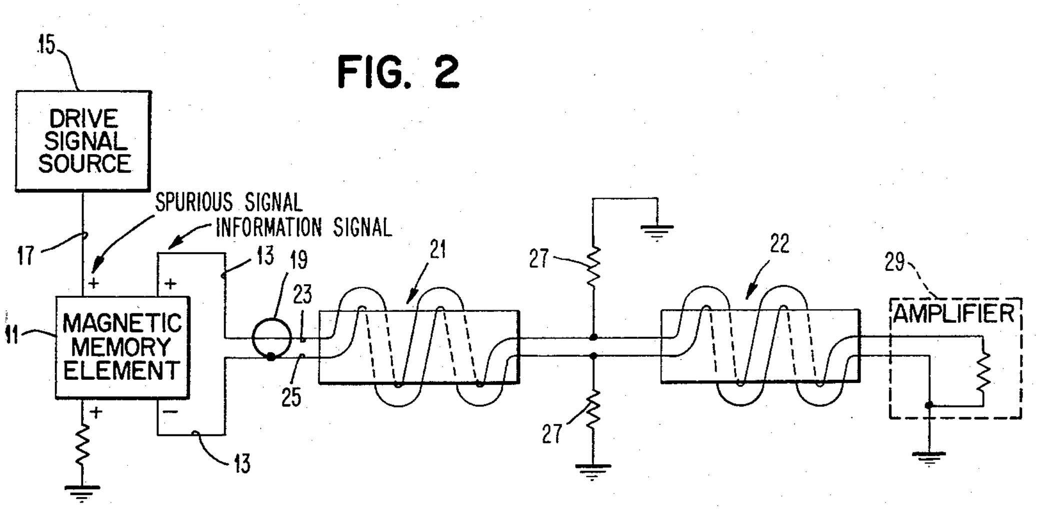
FIGURE 2 is a block schematic of the present read-out system with further means to attenuate the noise signals and provide a means to convert a balanced line into an unbalanced line.

Consider now FIGURE 2 which shows an additional coil 22 connected between the balanced output load 27 and the amplifier 29. The coil 22 serves to isolate the grounded amplifier 29 from the balanced load 27 in order to effect a translation from a balanced line to an unbalanced line.

If the grounded amplifier 29 were connected on the input side of the coil 22 or adjacent to the load 27 the input signals to the transmission line 19 would immediately see (through the distributed capacitance) ground potential on one side of the line and an impedance on the other side instead of the balanced load 27. Such an arrangement would reduce the common mode rejection in the coil 21. In other words in order to get maximum common mode signal rejection in the first stage of the circuit the first stage of the circuit must be maintained as a balanced line. The load resistors 27 are chosen to provide a smaller impedance to the common mode signal than does the coil 22, and hence the major portion of the common mode signal is rejected in the coil 21. In addition to providing an isolating impedance in order to effect the balanced line to unbalance line translation, the coil 22 provides an additional means of further rejecting the common mode signal.

By providing a means to transform the system from a balanced line to an unbalanced line, the amplifier 29 is directly connected to the circuit and thereby saves many components which would be necessary if, for instance, a difference amplifier is employed as shown in the circuit of FIGURE 1.

While I have described above the principles of my invention in connection with specific apparatus, it is to be clearly understood that this description is made only by way of example and not a limitation to the scope of my invention as set forth in the objects thereof and in the accompanying claims.

What is claimed is:

1. A magnetic memory element read-out system comprising: a magnetic memory element capable of generating information signals in accordance with information stored therein and in response to drive signals applied thereto; at least one drive-signal means coupled to said memory element; a transmission line having input signal means coupled to said memory element to act as a sensing line therewith, said transmission line having a portion thereof formed in a coil configuration thereby providing a relatively large impedance to attenuate the spurious signals generated by the capacitance and inductance coupling between said drive-signal means and the input signal means of said transmission line, said coil formed portion of said transmission line not presenting a high impedance to said information signals; and load means coupled across said transmission line to accept said information signals and said attenuated spurious signals.

2. A magnetic memory element read-out system comprising: a magnetic memory element capable of generating information signals in accordance with information stored therein and in response to driven signals applied thereto; at least one drive-signal means coupled to said memory element; a transmission line having input signal means coupled to said memory element to act as a sensing line therewith; magnetizable means having a portion of said transmission line wound therearound in a coil form, thereby providing a relatively large impedance to attenuate the spurious signals generated by the capacitance and inductance coupling between said drive-signal means and the input signal means of said transmission line, said coil formed portion of said transmission line not presenting a high impedance to said information signals; and difference amplifier means coupled across said transmission line to accept said information signals and said attenuated spurious signals.

3. A magnetic memory element read-out system comprising: a magnetic memory element capable of generating information signals in accordance with information stored therein and in response to drive signals applied thereto; at least one drive-signal means coupled to said memory element; a transmission line having input means coupled to said memory element to act as a sensing line therewith; a first portion of said transmission line formed in a first coil configuration thereby providing a relatively large impedance to attenuate the spurious signals generated by the capacitance and inductance coupling between said drive-signal means and the input signal means of said transmission line, said first coil formed portion of said transmission line not presenting a high impedance to said information signal; balanced load means coupled to the output side of said first coil portion of said transmission line; unbalanced load means; a second portion of said transmission line formed in a second coil configuration connected to said balanced load means and to said unbalanced load means thereby providing an isolation impedance, to spurious signals but not to information signals, between the balanced portion of said transmission line and said unbalanced load to effect a transformation from a balanced line to an unbalanced line while simultaneously obtaining optimum rejection of spurious signals.

4. A magnetic memory element read-out system comprising: a magnetic memory element capable of generating information signals in accordance with information stored therein and in response to drive signals applied thereto; at least one drive-signal means coupled to said memory element; a transmission line having input signal means coupled to said memory element to act as a sensing line therewith; first magnetizable means having a portion of said transmission line wound therearound forming a first coil, thereby providing a relatively large impedance to attenuate the spurious signals generated by the capacitance and inductance coupling between said drive-signal means and the input signal means of said transmission line, said first coil not presenting a high impedance to said information signals; balanced load means coupled to the output side of said first coil; unbalanced load means; second magnetizable means having a portion of said transmission line wound therearound forming a second coil, said second coil connected between said balanced load means and said unbalanced load means thereby providing an isolation impedance, to spurious signals but not to information signals, between the balanced portion of said line and the unbalanced load to effect a transformation from a balanced line to an unbalanced line while simultaneously obtaining optimum rejection of said spurious signals.

5. A magnetic memory element read-out system according to claim 4 wherein said balanced load means includes a pair of resistors one each of which is connected to each line in said transmission line and wherein each of said resistors provides a smaller impedance to said spurious signals than does said second coil.

6. A magnetic memory element read-out system according to claim 4 wherein said unbalanced load means includes an amplifier which is grounded to one side of said transmission line.

References Cited by the Examiner

UNITED STATES PATENTS

| | | | |
|---|---|---|---|
| 1,964,048 | 6/1934 | Gerth | 333—12 |
| 1,994,905 | 3/1935 | Bowles | 333—12 |
| 2,419,907 | 4/1947 | Mole | 333—12 |
| 2,485,457 | 10/1949 | Potter | 333—12 |
| 2,736,880 | 2/1956 | Forrester | 340—174 |
| 2,900,624 | 8/1959 | Stuart-Williams et al. | 340—174 |
| 3,054,926 | 9/1962 | Graham | 333—12 |
| 3,142,049 | 7/1964 | Crawford | 340—174 |

BERNARD KONICK, *Primary Examiner.*

IRVING SRAGOW, *Examiner.*

R. R. HUBBARD, H. D. VOLK, J. MOFFITT, *Assistant Examiners.*